(12) United States Patent
Sriram et al.

(10) Patent No.: US 12,009,942 B2
(45) Date of Patent: Jun. 11, 2024

(54) SCALABLE PROVISIONING OF AGGREGATION DEVICES WITH DIFFERENTIATED FEATURES

(71) Applicant: Charter Communications Operating, LLC, St. Louis, MO (US)

(72) Inventors: Ajay G. Sriram, Lone Tree, CO (US); Stephen Gionfriddo, Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/977,133

(22) Filed: Oct. 31, 2022

(65) Prior Publication Data
US 2024/0146573 A1 May 2, 2024

(51) Int. Cl.
*H04L 12/28* (2006.01)

(52) U.S. Cl.
CPC ...... *H04L 12/2898* (2013.01); *H04L 12/2858* (2013.01); *H04L 12/2874* (2013.01)

(58) Field of Classification Search
CPC ............ H04L 12/2898; H04L 12/2858; H04L 12/2874
USPC ........................................................ 709/224
See application file for complete search history.

(56) References Cited

U.S. PATENT DOCUMENTS

| | | | |
|---|---|---|---|
| 9,425,977 B2 * | 8/2016 | Pfeffer | H04L 12/2801 |
| 10,594,580 B2 * | 3/2020 | Ilyadis | H04L 43/20 |
| 10,715,213 B1 * | 7/2020 | Stelle, IV | H04L 27/2653 |
| 11,082,502 B2 * | 8/2021 | Bernstein | H04L 41/0894 |
| 11,316,935 B2 * | 4/2022 | Goeringer | H04L 45/64 |
| 11,323,325 B1 * | 5/2022 | Hullahalli | H04L 41/40 |
| 11,570,737 B1 * | 1/2023 | Wallace | H04W 60/00 |
| 11,589,243 B2 * | 2/2023 | Kumar | H04L 67/10 |
| 11,729,077 B2 * | 8/2023 | Qian | H04L 41/22 |
| | | | 709/224 |
| 2015/0156081 A1 * | 6/2015 | Chakra | H04L 41/5006 |
| | | | 709/224 |
| 2015/0195164 A1 * | 7/2015 | Klein | H04L 43/0876 |
| | | | 709/224 |
| 2015/0195172 A1 * | 7/2015 | Abuelsaad | H04L 41/5058 |
| | | | 709/224 |
| 2015/0244596 A1 * | 8/2015 | Abuelsaad | H04L 67/60 |
| | | | 709/224 |
| 2016/0036924 A1 * | 2/2016 | Koppolu | H04L 67/1025 |
| | | | 709/224 |
| 2018/0027080 A1 * | 1/2018 | Yang | H04L 47/70 |
| | | | 709/224 |
| 2022/0311837 A1 * | 9/2022 | Gupta | H04L 67/10 |
| 2023/0051473 A1 * | 2/2023 | Wallace | H04W 8/24 |

(Continued)

*Primary Examiner* — Melvin H Pollack
(74) *Attorney, Agent, or Firm* — Dority & Manning, P.A.

(57) ABSTRACT

It is determined that a first customer premises equipment (CPE) that provides external network access to a first local area network and that is communicatively coupled to a first aggregation device is to be dynamically provisioned with a first differentiated feature that is different from default features identified in a first boot configuration from which the first CPE obtains features during a boot phase of the first CPE. A first aggregation driver process that corresponds to the first aggregation device is identified. A request to implement the first differentiated feature on the first aggregation device is sent to the first aggregation driver process.

20 Claims, 6 Drawing Sheets

(56) References Cited

U.S. PATENT DOCUMENTS

| | | | |
|---|---|---|---|
| 2023/0164113 A1* | 5/2023 | Gupta | H04L 63/0272 709/245 |
| 2023/0205606 A1* | 6/2023 | Palermo | G06F 9/5094 718/104 |
| 2023/0262117 A1* | 8/2023 | Bernardos | H04L 67/12 709/224 |

* cited by examiner

SCALABLE PROVISIONING OF AGGREGATION DEVICES WITH DIFFERENTIATED FEATURES

BACKGROUND

A service provider that provides data services, such as Internet access, to subscribers, such as residences and businesses, may have hundreds or thousands of aggregation devices, such as cable modem termination systems (CMTSs), located throughout a large geographic area. Each aggregation device may communicate with hundreds or thousands of customer premises equipment (CPE), such as cable modems, which are physically located in the premises of the subscribers.

SUMMARY

The embodiments disclosed herein implement scalable provisioning of aggregation devices with differentiated features, and differentiated feature state synchronization between a policy controller of the service provider network and the aggregation devices.

In one embodiment a method is provided. The method includes determining, by a policy controller executing on a computing system comprising one or more computing devices, that a first customer premises equipment (CPE) that provides external network access to a first local area network and that is communicatively coupled to a first aggregation device is to be dynamically provisioned with a first differentiated feature that is different from default features identified in a first boot configuration from which the first CPE obtains features during a boot phase of the first CPE. The method further includes identifying, by the policy controller, a first aggregation driver process that corresponds to the first aggregation device. The method further includes sending, by the policy controller to the first aggregation driver process, a request to implement the first differentiated feature on the first aggregation device.

In another embodiment a computing system is provided. The computing system includes one or more computing devices operable to determine that a first customer premises equipment (CPE) that provides external network access to a first local area network and that is communicatively coupled to a first aggregation device is to be dynamically provisioned with a first differentiated feature that is different from default features identified in a first boot configuration from which the first CPE obtains features during a boot phase of the first CPE. The one or more computing devices are further operable to identify a first aggregation driver process that corresponds to the first aggregation device. The one or more computing devices are further operable to send, to the first aggregation driver process, a request to implement the first differentiated feature on the first aggregation device.

In another embodiment a non-transitory computer-readable storage medium is provided. The non-transitory computer-readable storage medium includes executable instructions to cause one or more processor devices to determine that a first customer premises equipment (CPE) that provides external network access to a first local area network and that is communicatively coupled to a first aggregation device is to be dynamically provisioned with a first differentiated feature that is different from default features identified in a first boot configuration from which the first CPE obtains features during a boot phase of the first CPE. The instructions further cause the one or more processor devices to identify a first aggregation driver process that corresponds to the first aggregation device. The instructions further cause the one or more processor devices to send, to the first aggregation driver process, a request to implement the first differentiated feature on the first aggregation device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable individuals to practice the embodiments and illustrate the best mode of practicing the embodiments. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

A service provider that provides data services, such as Internet access, to subscribers, such as residences and businesses, may have hundreds or thousands of aggregation devices, such as cable modem termination systems (CMTSs), located throughout a large geographic area. Each aggregation device may communicate with hundreds or thousands of customer premises equipment (CPE), such as cable modems, which are physically located in the premises of the subscribers.

A subscriber that obtains network access from the service provider typically chooses a particular service tier that defines certain features, such as, for example, quality of service (QoS) features such as bandwidth. A CPE, in conjunction with the aggregation device to which the CPE is communicatively coupled, implements the features associated with a particular subscriber. At times, in response to certain events, an aggregation device may be instructed to configure itself and dynamically provision the CPE with a different feature than that identified in a default configuration of the CPE. Such dynamically provisioned features are typically provisioned for a temporary timeframe. Examples of such dynamically provisioned features include a bandwidth feature, a device priority feature, and a traffic type priority feature. Such features may be used, for example, to implement increased bandwidth, higher priority for traffic flows associated with a particular device, higher priority for a particular type of traffic type, or the like.

A large service provider network may require relatively continuous communications with hundreds or thousands of aggregation devices. The aggregation devices may be from different manufacturers and/or be different models from the same manufacturer. The communication syntax for communicating with aggregation devices may differ from manufacturer to manufacturer, and from model to model.

Typically communications with aggregation devices are handled by a monolithic service that is programmed to interact with each different type of aggregation device in the service provider network. Any time a new aggregation device or model is introduced into the service provider network, the monolithic service must be modified, tested, debugged, and as the codebase of the monolithic service grows, such modifications, testing and debugging take an increased amount of time.

In addition, an aggregation device may be provisioned with hundreds or thousands of differentiated features spread out over hundreds or thousands of CPE to which the aggregation device is communicatively coupled. Network problems and/or device problems may, at times, lead to a different differentiated feature state on the aggregation device than the service provider network understands the state to be. As an example, an aggregation device may not have a differentiated feature that the service provider network believes is implemented on the aggregation device, or may have a differentiated feature that the service provider network is unaware of. An inconsistency between the actual state of the differentiated features implemented by aggregation devices and the believed state of the differentiated features implemented by aggregation devices can lead to customer dissatisfaction, and incorrect decisions by the service provider network.

The embodiments disclosed herein implement scalable provisioning of aggregation devices with differentiated features, and differentiated feature state synchronization between a policy controller of the service provider network and the aggregation devices.

Figure 1:
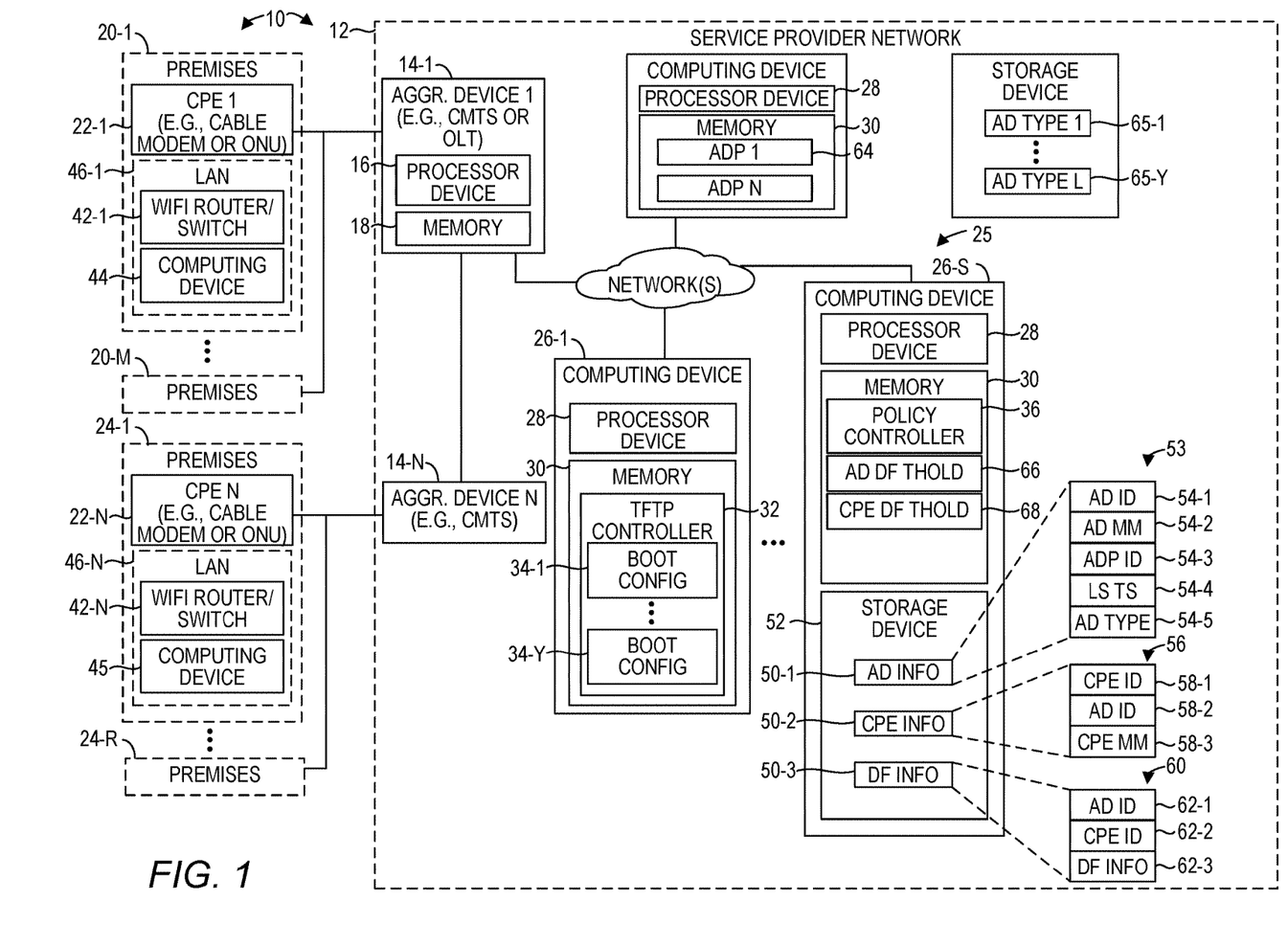
FIG. 1 is a block diagram of an environment in which scalable provisioning of aggregation devices with differentiated features may be practiced according to some embodiments.

FIG. 1 is a block diagram of an environment 10 in which scalable provisioning of aggregation devices with differentiated features may be practiced according to some embodiments. The environment 10 includes a service provider network 12 that includes a plurality of aggregation devices 14-1-14-N. The aggregation device 14-1 includes a processor device 16 and a memory 18, and provides services, such as, by way of non-limiting example, Internet access and/or voice services, to a plurality of premises 20-1-20-M.

The aggregation device 14-1 communicates with a customer premises equipment (CPE) 22-1 in the premises 20-1 via, for example, a coaxial cable or a fiber cable. The CPE 22-1 may comprise, for example, a cable modem or a fiber modem. The aggregation device 14-1 may comprise, for example, a cable modem termination system (CMTS) or a fiber aggregation system such as an Optical Line Terminal (OLT). For purposes of illustration only one CPE 22-1 is shown, however, in practice, the aggregation device 14-1 communicates with a CPE 22 located in each of the premises 20-1-20-M, and thus may be coupled to tens, hundreds or thousands of CPEs 22.

The aggregation device 14-N similarly provides services, such as Internet access and/or voice services, to a plurality of premises 24-1-24-R and communicates with CPEs 22 located in such premises 24-1-24-R. The aggregation devices 14-1-14-N may be generally referred to herein as the aggregation devices 14. While only two aggregation devices 14 are illustrated, the service provider network 12 may include thousands of aggregation devices 14 spread out over a large geographic area, such as the United States.

The aggregation devices 14 communicate with a computing system 25 that includes one or more computing devices 26-1-26-S in the service provider network 12, each of which includes a processor device 28 and a memory 30. The computing device 26-1 includes a TFTP controller 32 that maintains a plurality of boot configurations 34-1-34-Y, each of which may correspond to a particular CPE 22. In this example, the boot configuration 34-1 corresponds to the CPE 22-1 in the premises 20-1 and is provided by the TFTP controller 32 to the CPE 22-1 when the CPE 22-1 initiates a boot phase. The boot configuration 34-1 contains default features, including default QoS features, that the CPE 22-1 loads during the boot phase. Such default features may include, by way of non-limiting example, upload and download bandwidths that the CPE 22-1 is to provide. The CPE 22-1 may initiate the boot phase when powering on, in response to a signal from another device, such as the aggregation device 14-1, or in response to a user in the premises 20-1 physically contacting a reset actuation button on the CPE 22-1. Similarly, the boot configuration 34-Y corresponds to the CPE 22-N in the premises 24-1 and is provided by the TFTP controller 32 to the CPE 22-N when the CPE 22-N initiates the boot phase.

The computing device 26-S includes a policy controller 36 that operates to establish aggregation driver processes for communicating with the aggregation devices 14, as will be described herein.

The CPEs 22-1 and 22-N may be communicatively coupled to corresponding routers 42-1 and 42-N that implement local area networks 46-1 and 46-N in the premises 20-1 and 24-1, respectively. The router 42-1 may be communicatively coupled to one or more computing devices 44, such as computers, smart phones, televisions, or any other network-capable processing device, and may provide such computing devices 44 the ability to communicate with computing devices external to the LAN 46-1 and with the other computing device 44 on the LAN 46-1. Similarly, the router 42-N may be communicatively coupled to one or more computing devices 45, and may provide such computing devices 45 the ability to communicate with computing devices external to the LAN 46-N and with the other computing device 45 on the LAN 46-N. The CPE 22-1, in conjunction with the aggregation device 14-1, facilitates access between the computing devices 44 and computing devices on networks that are external to the LAN 46-1. The CPE 22-N, in conjunction with the aggregation device 14-N, facilitates access between the computing devices 45 and computing devices on networks that are external to the LAN 46-N.

The policy controller 36 utilizes a plurality of data stores 50 in one or more storage devices 52 to keep track of the state of the service provider network 12. An aggregation device information data store 50-1 contains an entry 53 for each aggregation device 14. Each entry 53 includes an aggregation device identifier (ID) field 54-1 ("AD ID") that identifies the aggregation device 14, an aggregation device maintenance status indicator field 54-2 ("AD MM") that identifies whether the aggregation device 14 is currently in a maintenance mode, an aggregation driver process field 54-3 ("ADP ID") that identifies the aggregation driver process that corresponds to the aggregation device 14 if an aggregation driver process exists for the aggregation device 14, a last synchronization timestamp field 54-4 ("LS TS") that identifies the time at which a synchronization process, as will be discussed in greater detail below, has been performed for the aggregation device 14, and an aggregation device type field 54-5 ("AD TYPE") that identifies a type of the aggregation device 14. It is noted that while only one entry 53 is illustrated, the aggregation device information data store 50-1 contains an entry 53 for each aggregation device 14 in the service provider network 12, and thus there may be thousands of entries 53.

A CPE information data store 50-2 contains an entry 56 for each CPE 22. Each entry 56 includes a CPE ID field 58-1 ("CPE ID") that identifies the CPE 22, an aggregation device ID field 58-2 ("AD ID") that identifies the aggregation device 14 to which the CPE 22 is communicatively coupled, and a CPE maintenance status indicator field 58-3 ("CPE MM") that identifies whether the CPE 22 is currently in a maintenance mode. It is noted that while only one entry 56 is illustrated, the CPE information data store 50-2 contains an entry 56 for each CPE 22 in the service provider network 12, and thus there may be thousands or millions of entries 56.

A differentiated feature information data store 50-3 contains an entry 60 for each differentiated feature that the policy controller 36 believes is implemented on an aggregation device 14 and CPE 22. Each entry 60 includes an aggregation device ID field 62-1 ("AD ID") that identifies the aggregation device 14 that has been provisioned with the "gate" that defines the differentiated feature, a CPE ID field 62-2 ("CPE ID") that identifies the CPE 22 that has been dynamically provisioned with the differentiated feature, and a differentiated information field 62-3 that identifies the differentiated feature, and which may include the parameters such as flow information and the like, that defines the gate on the aggregation device 14. It is noted that while only one entry 60 is illustrated, the differentiated feature information data store 50-3 contains an entry 60 for each differentiated feature that the policy controller 36 believes is implemented on an aggregation device 14 and CPE 22, and thus there may be millions of entries 60.

The policy controller 36 may determine that the CPE 22-1 is to be dynamically provisioned with a differentiated feature. This determination may be made, by way of non-limiting example, in response to a user request, in response to an operator request, in response to an occurrence of an event, such as a detection of a certain type of traffic being sent or received by the CPE 22-1, in response to the connection of a particular computing device 44 to the router 42-1, or in response to any other suitable condition, criteria or event.

The term "differentiated feature" refers to a feature that was dynamically provisioned. The term "dynamically provisioned", as used herein, refers to modifying, via the aggregation device 14-1, a feature of the CPE 22-1 without causing or requiring a reboot of the CPE 22-1. In particular, the CPE 22-1 may be dynamically provisioned with a feature via suitable instructions sent to the aggregation device 14-1. The aggregation device 14-1 implements the feature on the aggregation device 14-1 through what is sometimes referred to as a "gate", which comprises a logical structure that defines how the aggregation device 14-1 should treat a particular network flow between a CPE 22 coupled to the aggregation device 14-1 and a computing device upstream of the aggregation device 14-1. The aggregation device 14-1 also communicates with the CPE 22-1 to cause the differentiated feature to be dynamically provisioned on the CPE 22-1.

The particular instructions may differ depending on the manufacturer and/or model of the aggregation device 14-1 and the CPE 22-1. The term "feature" as used herein refers to parameters of the CPE 22-1 that cause the CPE 22-1 to process one or more packet flows in a particular manner, such as providing one or more packet flows with a particular bandwidth, providing a packet flow associated with a particular computing device 44 a higher or lower priority than packet flows associated with other computing devices 44, providing packet flows associated with a particular traffic type, such as a gaming traffic type, a higher priority than other packet flows, providing all packet flows a higher bandwidth than a default bandwidth, and the like. As another example, the CPE 22-1 may be dynamically provisioned with a differentiated QoS feature to provide the computing device 44-1 a higher bandwidth than a default bandwidth of the CPE 22-1 due to a particular attribute of the computing device 44-1.

In response determining that the CPE 22-1 is to be dynamically provisioned with a differentiated feature, the policy controller 36 may access the CPE information data store 50-2 to determine the aggregation device 14 to which the CPE 22-1 is communicatively coupled, and whether the CPE 22-1 is in a maintenance. The policy controller 36 accesses the entry 56 that corresponds to the CPE 22-1 and accesses the CPE maintenance status indicator field 58-3 to determine if the CPE 22-1 is in a maintenance mode. If so, the policy controller 36 may reject the request. If not, the policy controller 36 may access the aggregation device ID field 58-2 to determine the aggregation device 14 to which the CPE 22-1 is communicatively coupled, which, in this example, is the aggregation device 14-1. The policy controller 36 may then access the aggregation device information data store 50-1 to determine whether an aggregation driver process has been initiated for the aggregation device 14-1.

The policy controller 36 accesses the entry 53 that corresponds to the aggregation device 14-1 and accesses the aggregation device maintenance status indicator field 54-2 to determine whether the aggregation device 14-1 is in a maintenance mode. If so, the policy controller 36 may reject the request. If not, the policy controller 36 may access the aggregation driver process field 54-3. If no aggregation driver process exists for the aggregation device 14-1, as may occur, for example, if this is the first differentiated feature implemented on the aggregation device 14-1, the aggregation driver process field 54-3 may have a null or other value that indicates that no aggregation driver process exists. Otherwise, the aggregation driver process field 54-3 contains address or location information suitable for the policy controller 36 to communicate with the aggregation driver process.

The policy controller 36 may access the differentiated feature information data store 50-3 to determine the total quantity of differentiated features that are currently implemented on the aggregation device 14-1 and the total quantity of differentiated features that are currently implemented on the CPE 22-1. The policy controller 36 may then compare the total quantity of differentiated features that are currently implemented on the aggregation device 14-1 to an aggregation device differentiated feature threshold value 66. If the total quantity of differentiated features that are currently implemented on the aggregation device 14-1 equals or exceeds the aggregation device differentiated feature threshold value 66, the policy controller 36 may reject the differentiated feature request. The policy controller 36 may compare the total quantity of differentiated features that are currently implemented on the CPE 22-1 to a CPE differentiated feature threshold value 68. If the total quantity of differentiated features that are currently implemented on the CPE 22-1 equals or exceeds the CPE differentiated feature threshold value 68, the policy controller 36 may reject the differentiated feature request. In some implementations, the policy controller 36 may also determine whether the aggregation device 14-1 is operating at or above a particular threshold, such as at or above a bandwidth utilization threshold. If so, the policy controller 36 may decide not to dynamically provision the CPE 22-1 with the differentiated feature to prevent loading the network with more bandwidth. In some implementations, the policy controller 36 may also determine whether the number of devices on the LAN 46-1, which are currently associated with a differentiated feature, meets a predetermined threshold, such as four devices. If so, the policy controller 36 may decide not to dynamically provision the CPE 22-1 with the differentiated feature.

For purposes of illustration, it will be assumed that the total quantity of differentiated features that are currently implemented on the aggregation device 14-1 does not exceed the aggregation device differentiated feature threshold value 66, and that the total quantity of differentiated features that are currently implemented on the CPE 22-1 does not exceed the CPE differentiated feature threshold value 68. It will be further assumed that the aggregation driver process field 54-3 indicates that no aggregation driver process has yet been initiated for the aggregation device 14-1. The policy controller 36 accesses the aggregation device type field 54-5 of the entry 53 that corresponds to the aggregation device 14-1. The policy controller 36 may then cause an initiation of an aggregation driver process 64 on a computing device 26-2 that corresponds to the appropriate aggregation device type. In particular, the computing system 25 may maintain a plurality of aggregation driver executables 65-1-65-Y, each of which corresponds to a particular type of aggregation device 14 and which contains the appropriate instructions to communicate with aggregation devices 14 of the particular type. The policy controller 36 causes the aggregation driver process 64 to be initiated from the aggregation driver executable 65-1, which in this example, corresponds to the aggregation device type of the aggregation device 14-1.

In some implementations, the service provider network 12, at least in part, may be implemented via a container orchestration system, such as, by way of non-limiting example, the Kubernetes container orchestration system. The aggregation driver process 64 may comprise a container that executes in a pod, and the policy controller 36 may cause the initiation of the aggregation driver process 64 by communicating with Kubernetes to initiate a pod that identifies a container image, such as the aggregation driver executable 65-1, that, when executed, is instantiated as the aggregation driver process 64.

The policy controller 36 may then communicate with the aggregation driver process 64 to inform the aggregation driver process 64 that the aggregation driver process 64 corresponds to the aggregation device 14-1. The aggregation driver process 64 is operable to, upon request from the policy controller 36, communicate with the aggregation device 14-1 and thus off-loads processing that would otherwise be necessary for the policy controller 36 to handle. The policy controller 36 may then modify the aggregation driver process field 54-3 of the entry 53 to identify the aggregation driver process 64.

The policy controller 36 may then send, to the aggregation driver process 64, a request to implement the differentiated feature on the aggregation device 14-1. The aggregation driver process 64 sends an instruction to the aggregation device 14-1 instructing the aggregation device 14-1 to send instructions to the CPE 22-1 to process one or more packet flows differently from how such packet flows would otherwise be processed in accordance with a boot configuration of the CPE 22-1. As an example, the differentiated feature may indicate that packet flows associated with the computing device 44 are to be provided a greater bandwidth than a default bandwidth of the CPE 22-1. As another example, the differentiated feature indicate that network traffic (i.e., a packet flow) sent by or received by the computing device 44 is to have a higher priority than other network traffic on the local area network (LAN) 46-1.

The aggregation device 14-1 receives the instruction and generates a "gate" that identifies the differentiated feature and causes the aggregation device 14-1 to coordinate with the CPE 22-1 to implement the differentiated feature. The aggregation device 14-1 also sends instructions to the CPE 22-1 suitable to dynamically provision the CPE 22-1 with the differentiated feature.

The policy controller 36 also generates an entry 60 in the differentiated feature information data store 50-3 that identifies the differentiated feature and indicates the differentiated feature has been implemented on the aggregation device 14-1 and the CPE 22-1.

The differentiated feature may be temporary and end upon the occurrence of some event, such as a timer expiring, the computing device 44 leaving the LAN 46-1, or upon the occurrence of any other suitable event. Upon the occurrence of such event, the policy controller 36 may send instructions to the aggregation driver process 64 to instruct the aggregation device 14-1 to remove the differentiated feature from the CPE 22-1. The policy controller 36 may also then delete the entry 60 that corresponded to the differentiated feature from the differentiated feature information data store 50-3.

It is noted that because the policy controller 36 is a component of the computing device 26-S, functionality implemented by the policy controller 36 may be attributed to the computing device 26-S generally. Moreover, in examples where the policy controller 36 comprises software instructions that program the processor device 28 to carry out functionality discussed herein, functionality implemented by the policy controller 36 may be attributed herein to the processor device 28.

It is further noted that while the policy controller 36 is illustrated as a single component, the policy controller 36, in other embodiments, may be implemented in any number of components, and such components may be implemented on the same or separate computing devices 26.

Figure 2:
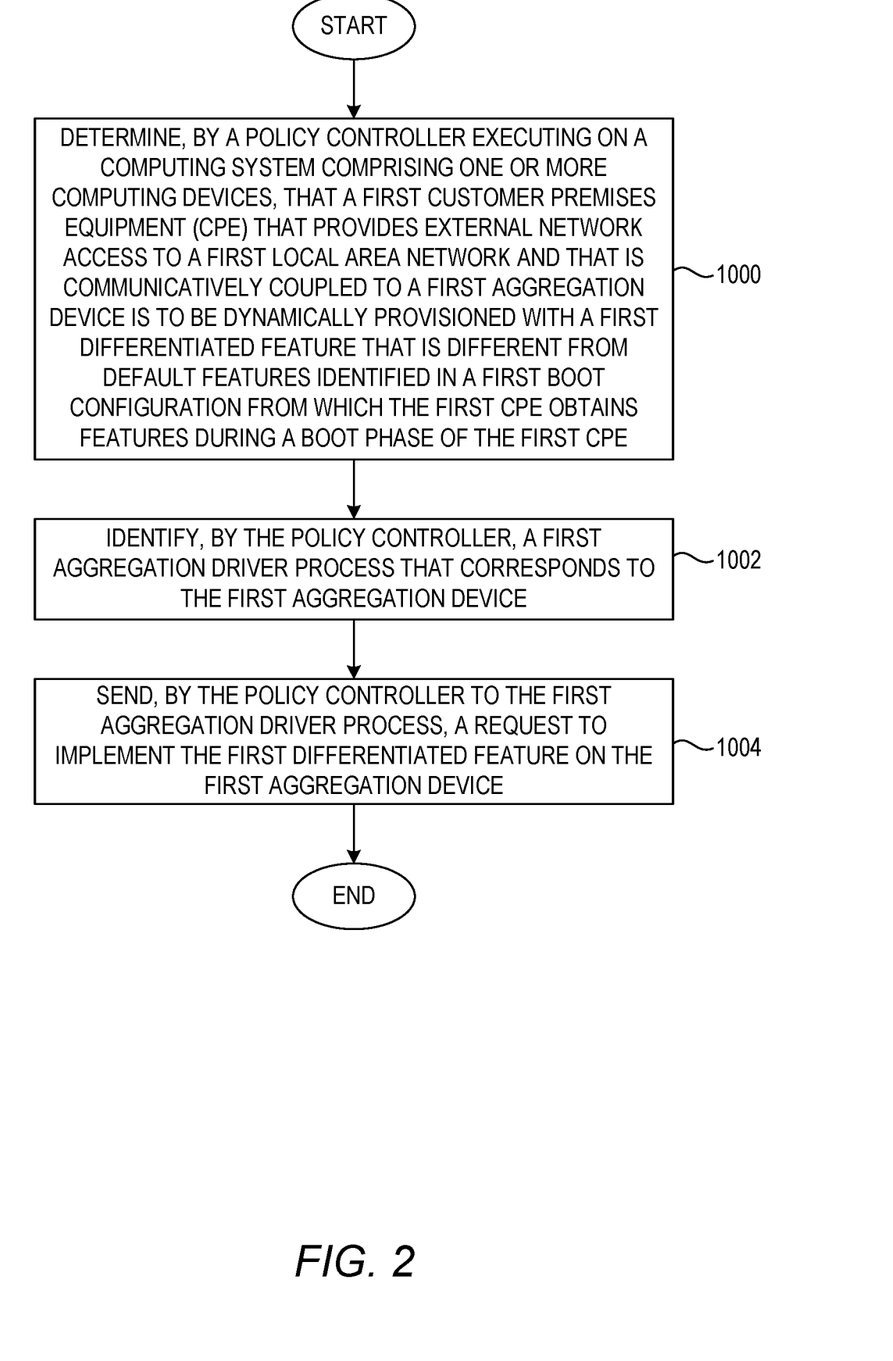
FIG. 2 is a flowchart of a method for scalable provisioning of aggregation devices with differentiated features according to some embodiments.

FIG. 2 is a flowchart of a method for scalable provisioning of aggregation devices with differentiated features according to some embodiments. FIG. 2 will be discussed in conjunction with FIG. 1. The computing system 25, comprising the one or more computing devices 26-1-26-S determines that the CPE 22-1 that provides external network access to the LAN 46-1 and that is communicatively coupled to the aggregation device 14-1 is to be dynamically provisioned with a differentiated feature that is different from default features identified in the boot configuration 34-1 from which the CPE 22-1 obtains features during a boot phase of the CPE 22-1 (FIG. 2, block 1000). The computing system 25 identifies the aggregation driver process 64 that corresponds to the aggregation device 14-1 (FIG. 2, block 1002). The computing system 25 sends, to the aggregation driver process 64, a request to implement the differentiated feature on the the aggregation device 14-1 (FIG. 2, block 1004).

Figure 3:
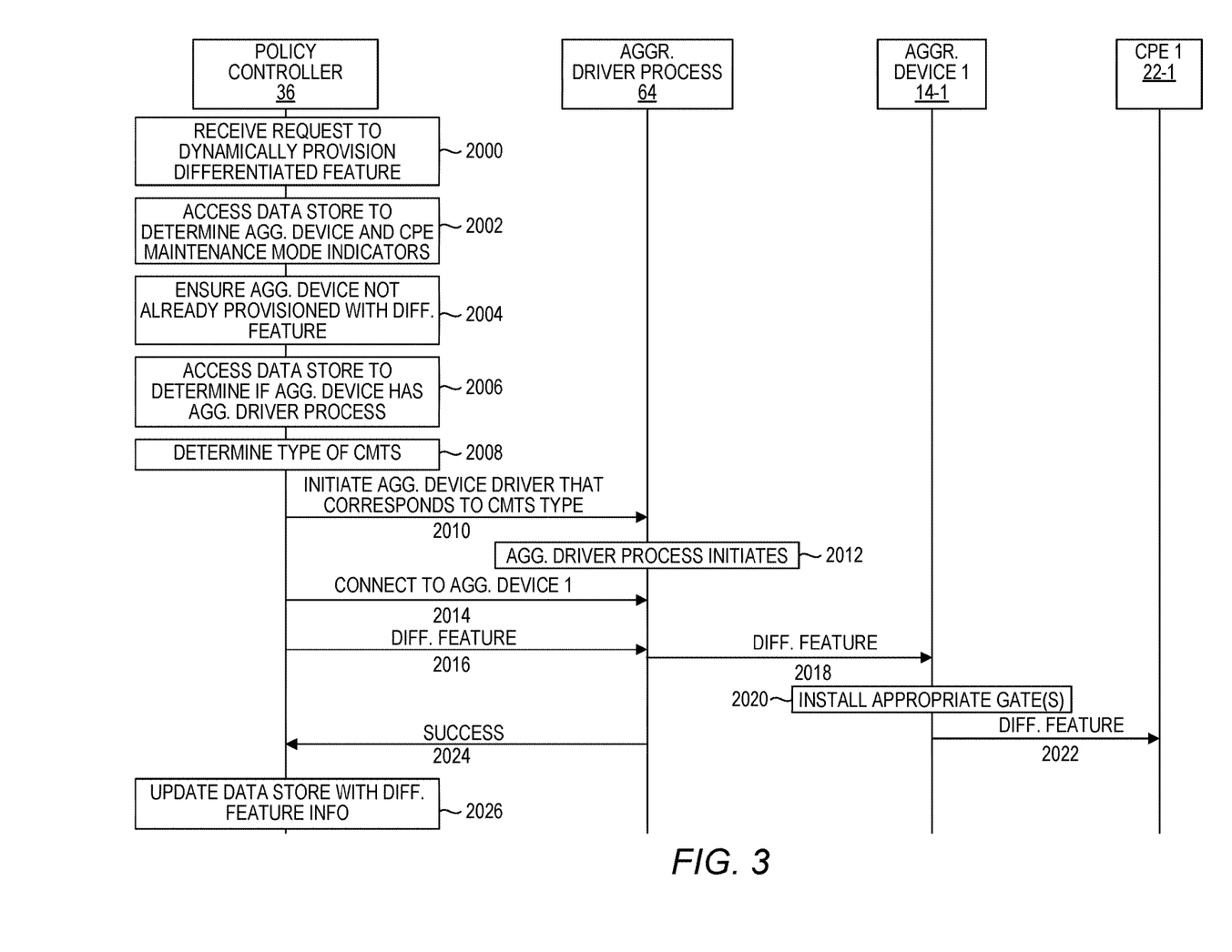
FIG. 3 is a sequence diagram that illustrates messages communicated between and actions taken by various components illustrated in FIG. 1 to implement scalable provisioning of aggregation devices with differentiated features according to some embodiments.

FIG. 3 is a sequence diagram that illustrates messages communicated between and actions taken by various components illustrated in FIG. 1 to implement scalable provisioning of aggregation devices with differentiated features according to some embodiments. The policy controller 36 determines that the CPE 22-1 should be dynamically provisioned with a differentiated feature (step 2000). This determination may be made in response to a request from an operator front-end application or a subscriber front-end application. In some implementations, the policy controller 36 may receive a request from another process that has programmatically determined that the CPE 22-1 should be provisioned with a differentiated feature based on some event associated with the LAN 46-1, such as a determination that a particular computing device 44 has joined the LAN 46-1, or a particular type of traffic flow, such as a voice or gaming traffic flow, has been initiated by a computing device 44 on the LAN 46-1. The differentiated feature may apply to the entire LAN 46-1, selected computing device(s) 44, or particular traffic flows on the LAN 46-1 (e.g., traffic between a particular computing device 44 and another computing device that is either on the LAN 46-1 or external to the LAN 46-1).

The policy controller 36 accesses the aggregation device information data store 50-1 and the CPE information data store 50-2 to determine that the CPE 22-1 is communicatively coupled to the aggregation device 14-1, and determine that neither the aggregation device 14-1 nor the CPE 22-1 are in a maintenance mode that would preclude the provisioning of the differentiated feature (step 2002). The policy controller 36 may access the differentiated feature information data store 50-3 to determine the current differentiated features that are provisioned on the aggregation device 14-1 and the CPE 22-1 to ensure that the aggregation device 14-1 and the CPE 22-1 are not already provisioned with the differentiated feature (step 2004). The policy controller 36 accesses the aggregation driver process field 54-3 of the entry 53 that corresponds to the aggregation device 14-1 and, in this example, determines that the aggregation device 14-1 currently has no corresponding aggregation driver process (step 2006).

The policy controller 36 accesses the aggregation device type field 54-5 of the entry 53 that corresponds to the aggregation device 14-1 and determines the particular aggregation device type of the aggregation device 14 (step 2008). The policy controller 36 causes the aggregation driver process 64 to be initiated from the aggregation driver executable 65-1 (steps 2010, 2012). The policy controller 36 then sends information to the aggregation driver process 64 identifying the aggregation device 14-1 as the aggregation device 14 to which the aggregation driver process 64 is to communicate (step 2014). The policy controller 36 sends a request to the aggregation driver process 64 to implement the differentiated feature on the aggregation device 14-1 (step 2016).

The aggregation driver process 64 sends instructions to the aggregation device 14-1 to install the differentiated feature on the aggregation device 14-1 (step 2018). The aggregation device 14-1 generates the appropriate gates that implement the differentiated feature on the aggregation device 14-1, and sends instructions to the CPE 22-1 to implement the differentiated feature on the CPE 22-1 (steps 2020, 2022). The aggregation driver process 64 sends a confirmation message to the policy controller 36 (step 2024). The policy controller 36 updates the differentiated feature information data store 50-3 to identify that the aggregation device 14-1 and the CPE 22-1 have been dynamically provisioned with the differentiated feature (step 2026).

It is desirable that the differentiated feature information data store 50-3 match the actual state of the aggregation devices 14 so that decisions made based on the differentiated feature information data store 50-3, such as based on the number of differentiated features currently implemented on an aggregation device 14 and/or CPE 22 are accurate. Moreover, an inconsistency between the differentiated feature information data store 50-3 and the actual state of an aggregation device 14 may mean that a differentiated feature that should be implemented on an aggregation device 14 has been lost, and should be re-provisioned.

The embodiments disclosed herein implement a continuous bulk synchronization process for each aggregation device 14 to verify the state of the aggregation device 14 compared to the state of the differentiated feature information data store 50-3 which reflects the believed state of the aggregation devices 14 from the perspective of the policy controller 36. The states may differ for a number of reasons, including, by way of non-limiting example, a fault in an aggregation device 14 or a packet error when attempting to update the differentiated feature information data store 50-3.

Figure 4A:
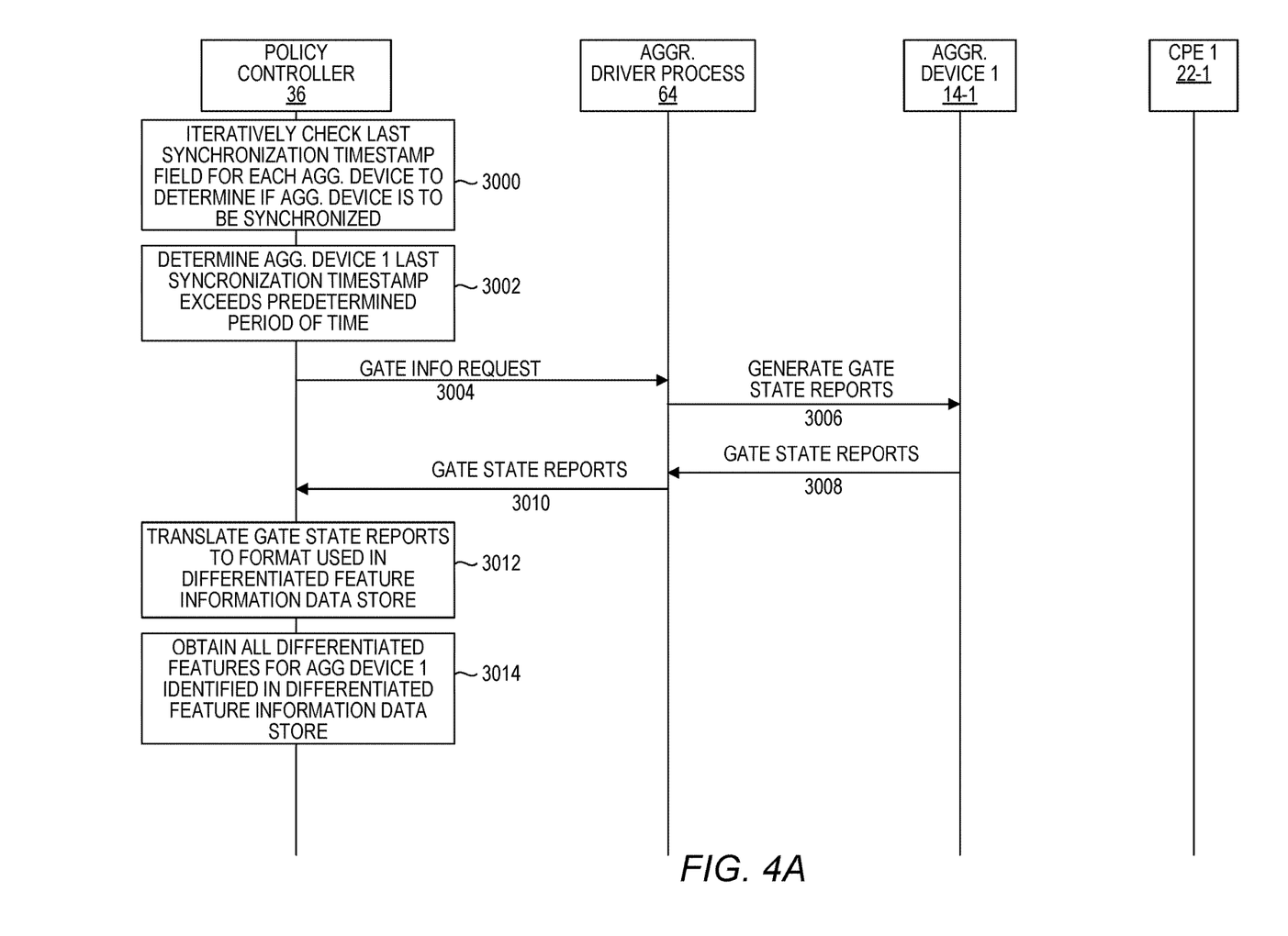
FIGS. 4A-4B are sequence diagrams that illustrate messages communicated between and actions taken by various components illustrated in FIG. 1 to implement a bulk synchronization process according to some embodiments.
Figure 4B:
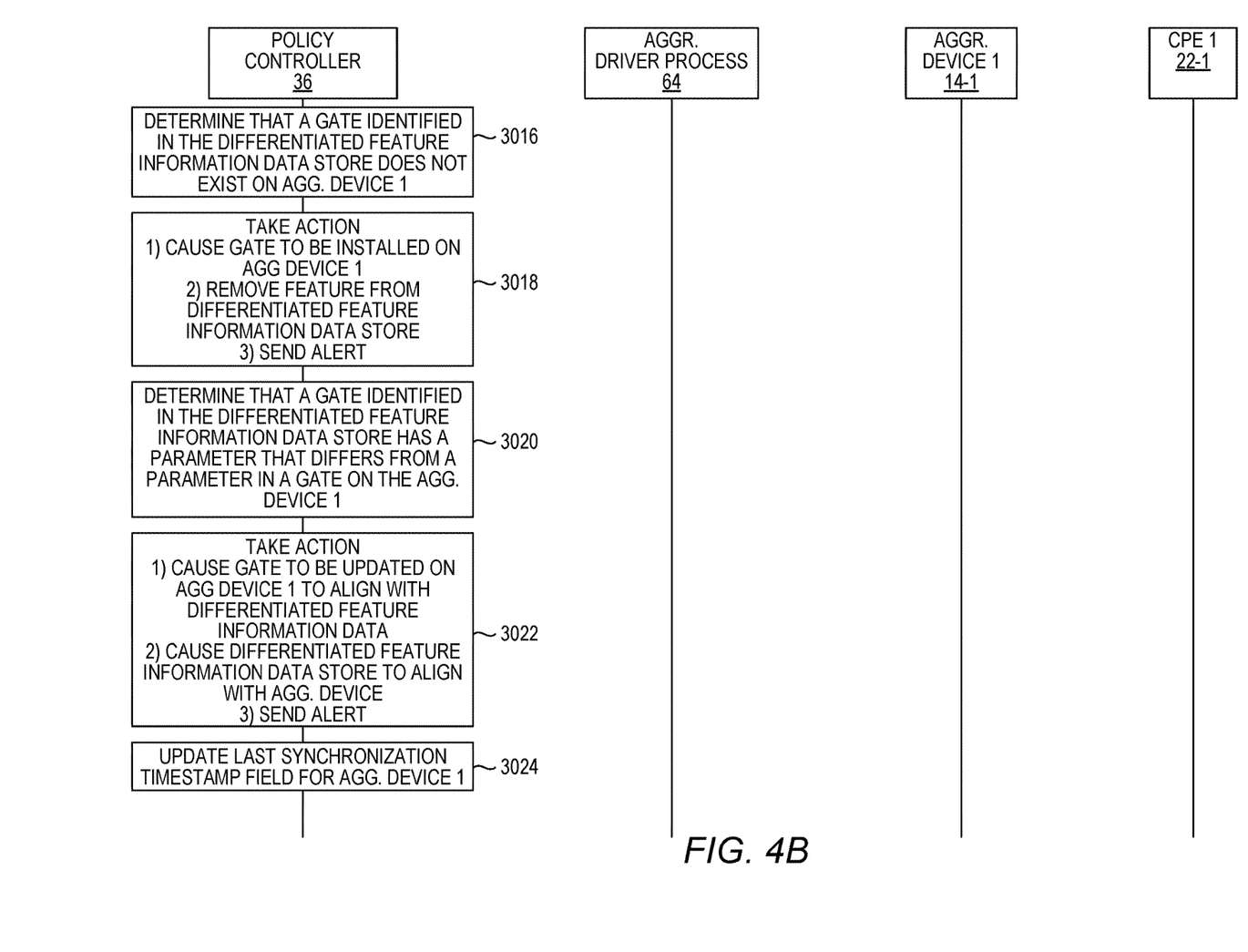

FIGS. 4A-4B are sequence diagrams that illustrate messages communicated between and actions taken by various components illustrated in FIG. 1 to implement a bulk synchronization process according to some embodiments. The policy controller 36 periodically or intermittently processes the aggregation device information data store 50-1 to determine whether, for each aggregation device 14, the last synchronization timestamp field 54-4 contains a timestamp that identifies a time that is older than a predetermined period of time from a current time, such as one second, ten seconds, one minute, or any other desirable timeframe (step 3000). In this example, the policy controller 36 determines that the last synchronization timestamp field 54-4 of the entry 53 that corresponds to the aggregation device 14-1 identifies a time that is older than a predetermined period of time from a current time (step 3002).

The policy controller 36 sends a request to the aggregation driver process 64 to obtain the gate information from the aggregation device 14-1 (step 3004). The gate information comprises the gate structures generated by the aggregation device 14-1 in response to being instructed to implement a differentiated feature. The aggregation driver process 64 sends a request to the aggregation device 14-1 requesting the aggregation device 14-1 to generate gate state reports that identify all the gates currently implemented on the aggregation device 14-1 (step 3006). The aggregation device 14-1 provides gate state reports to the aggregation driver process 64 (step 3008). The aggregation driver process 64 provides the gate state reports, or provides information indicating that the gate state reports are available, to the policy controller 36 (step 3010). The policy controller 36 may translate the gate state reports to a format consistent with the entries 60 of the differentiated feature information data store 50-3 to simplify comparisons (step 3012). The policy controller 36 accesses the differentiated feature information data store 50-3 to obtain a list of differentiated features that identifies the differentiated features implemented on the aggregation device 14-1 (step 3014).

Referring now to FIG. 4B, the policy controller 36 may identify a gate identified in a gate state report that is not identified in the list of differentiated features identified in the differentiated feature information data store 50-3, such that a differentiated feature identified in differentiated feature information data store 50-3 is not implemented in the aggregation device 14-1 (step 3016). In response, the policy controller 36 performs an action (step 3018). The action may be to send, to the aggregation driver process 64, a request to implement the differentiated feature that is identified in the list of differentiated features from the differentiated feature information data store 50-3. Alternatively, the action may be to delete, from the differentiated feature information data store 50-3, the entry 60 that identifies the differentiated feature. The action may be to, or in addition to the previous actions, to send an alert that indicates that the differentiated feature identified in the entry 60 is not implemented on the aggregation device 14-1.

The policy controller 36 may also determine that a parameter in a gate of the aggregation device 14-1 differs from a parameter in an entry 60 of the differentiated feature information data store 50-3 (step 3020). In response, the policy controller 36 performs an action (step 3022). The action may be to send, to the aggregation driver process 64, a request to modify the differentiated feature in the aggregation device 14-1 to match the parameter identified in the entry 60 and thereby align the aggregation device 14-1 with the state identified in the differentiated feature information data store 50-3. Alternatively, the action may be to modify the parameter identified in the entry 60 to match the parameter identified in the gate report to thereby align the differentiated feature information data store 50-3 with the state of the aggregation device 14-1. The action may be to, or in addition to the previous actions, send an alert that indicates that the parameter in the gate of the aggregation device 14-1 differs from a parameter in the entry 60 of the differentiated feature information data store 50-3. Subsequent to processing each of the gate reports received from the aggregation device 14-1, the policy controller 36 may then update the last synchronization timestamp field 54-4 with the current time (step 3024).

Figure 5:
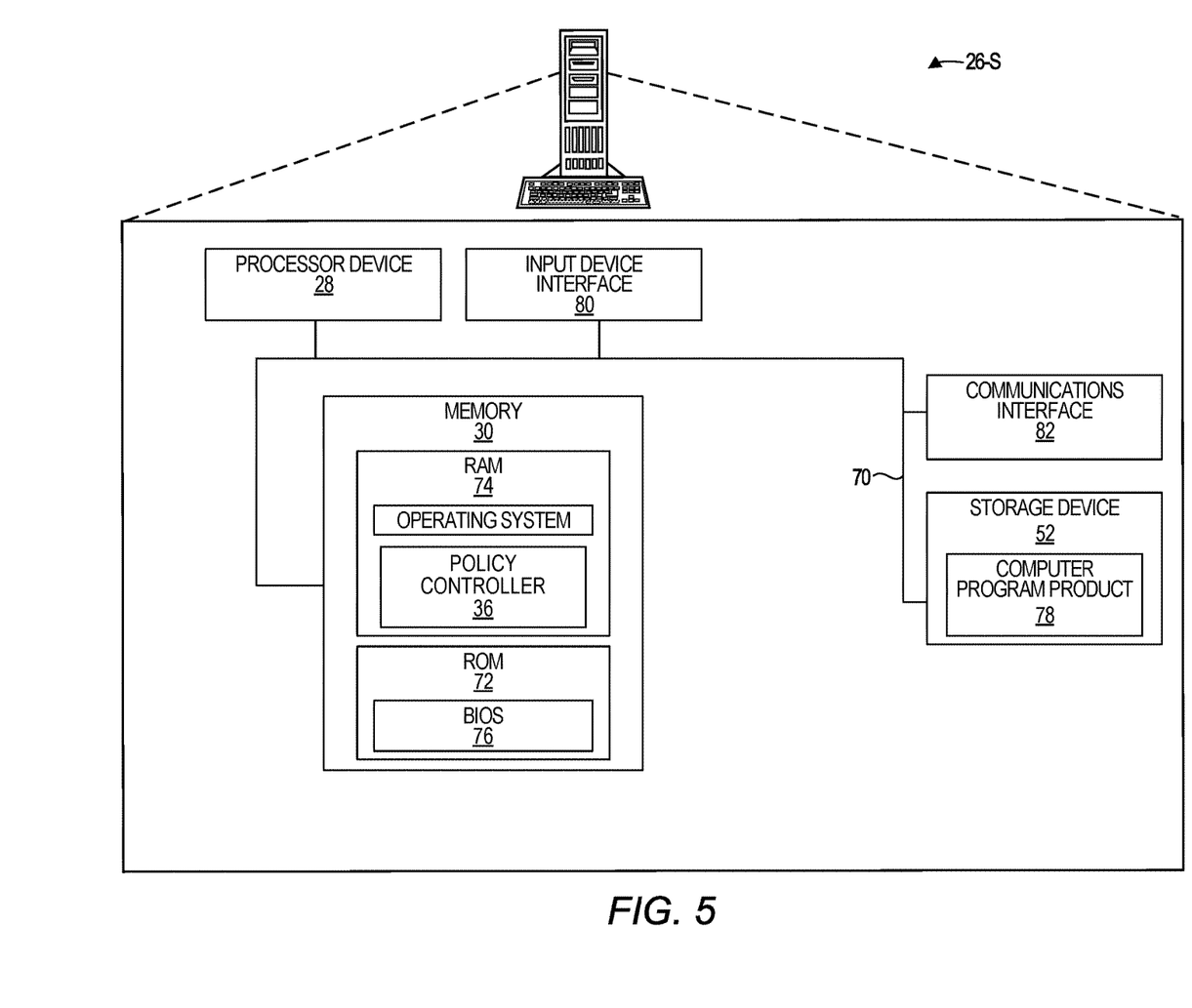
FIG. 5 is a block diagram of a computing device suitable for implementing the embodiments disclosed herein.

FIG. 5 is a block diagram of the computing device 26-S suitable for implementing the embodiments disclosed herein. The computing device 26-S may comprise any computing or electronic device capable of including firmware, hardware, and/or executing software instructions to implement the functionality described herein, such as a computer server, or the like. The computing device 26-S includes the processor device 28, the memory 30, and a system bus 70. The system bus 70 provides an interface for system components including, but not limited to, the memory 30 and the processor device 28. The processor device 28 can be any commercially available or proprietary processor.

The system bus 70 may be any of several types of bus structures that may further interconnect to a memory bus (with or without a memory controller), a peripheral bus, and/or a local bus using any of a variety of commercially available bus architectures. The memory 30 may include non-volatile memory 72 (e.g., read-only memory (ROM), erasable programmable read-only memory (EPROM), electrically erasable programmable read-only memory (EEPROM), etc.), and volatile memory 74 (e.g., random-access memory (RAM)). A basic input/output system (BIOS) 76 may be stored in the non-volatile memory 72 and can include the basic routines that help to transfer information between elements within the computing device 26-S. The volatile memory 74 may also include a high-speed RAM, such as static RAM, for caching data.

The computing device 26-S may further include or be coupled to a non-transitory computer-readable storage medium such as a storage device 52, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 52 and other drives associated with computer-readable media and computer-usable media may provide non-volatile storage of data, data structures, computer-executable instructions, and the like.

A number of modules can be stored in the storage device 52 and in the volatile memory 74, including an operating system and one or more program modules, such as the policy controller 36, which may implement the functionality described herein in whole or in part. All or a portion of the examples may be implemented as a computer program product 78 stored on a transitory or non-transitory computer-usable or computer-readable storage medium, such as the storage device 52, which includes complex programming instructions, such as complex computer-readable program code, to cause the processor device 28 to carry out the steps described herein. Thus, the computer-readable program code can comprise software instructions for implementing the functionality of the examples described herein when executed on the processor device 28. The processor device 28, in conjunction with the policy controller 36 in the volatile memory 74, may serve as a controller, or control system, for the computing device 26-S that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 28 through an input device interface 80 that is coupled to the system bus 70 but can be connected by other interfaces such as a parallel port, an Institute of Electrical and Electronic Engineers (IEEE) 1394 serial port, a Universal Serial Bus (USB) port, an IR interface, and the like. The computing device 26-S may also include a communications interface 82 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
    determining, by a policy controller executing on a computing system comprising one or more computing devices, that a first customer premises equipment (CPE) that provides external network access to a first local area network and that is communicatively coupled to a first aggregation device is to be dynamically provisioned with a first differentiated feature that is different from default features identified in a first boot configuration from which the first CPE obtains features during a boot phase of the first CPE;
    identifying, by the policy controller, a first aggregation driver process of a plurality of aggregation driver processes that corresponds to the first aggregation device of a plurality of aggregation devices; and
    sending, by the policy controller to the first aggregation driver process, a request to implement the first differentiated feature on the first aggregation device.

2. The method of claim 1 wherein identifying, by the policy controller, the first aggregation driver process that corresponds to the first aggregation device further comprises:
    accessing a data store that identifies the plurality of aggregation devices including the first aggregation device and that identifies, for each aggregation device that has a corresponding aggregation driver process, the corresponding aggregation driver process; and
    accessing an entry in the data store that identifies the first aggregation device and that identifies the first aggregation driver process.

3. The method of claim 1 wherein identifying, by the policy controller, the first aggregation driver process that corresponds to the first aggregation device further comprises:
    accessing a data store that identifies the plurality of aggregation devices including the first aggregation device and that identifies, for each aggregation device that has a corresponding aggregation driver process, the corresponding aggregation driver process;
    accessing an entry in the data store that identifies the first aggregation device;
    determining, based on the entry, that there is no corresponding aggregation driver process for the first aggregation device;
    causing, by the policy controller, an initiation of the first aggregation driver process; and
    modifying the entry to identify the first aggregation driver process.

4. The method of claim 3 further comprising:
    accessing, by the policy controller, information that identifies the first aggregation device as being a first aggregation device type of a plurality of different aggregation device types; and
    wherein causing, by the policy controller, the initiation of the first aggregation driver process comprises causing, by the policy controller, initiation of the first aggregation driver process from an executable that corresponds to the first aggregation device type.

5. The method of claim 1 further comprising:
    prior to sending the request to implement the first differentiated feature on the first aggregation device, accessing a first aggregation device maintenance status indicator that corresponds to the first aggregation device; and
    based on the first aggregation device maintenance status indicator, determining that the first aggregation device is not in a maintenance mode and can be provisioned with the first differentiated feature.

6. The method of claim 1 further comprising:
    prior to sending the request to implement the first differentiated feature on the first aggregation device, accessing a first CPE maintenance status indicator that corresponds to the first CPE; and
    based on the first CPE maintenance status indicator, determining that the first CPE is not in a maintenance mode and can be provisioned with the first differentiated feature.

7. The method of claim 1, further comprising:
    determining, by the policy controller, that a second CPE that provides external network access to a second local area network and that is communicatively coupled to a second aggregation device is to be dynamically provisioned with a second differentiated feature that is different from default features identified in a second boot configuration from which the second CPE obtains features during a boot phase of the second CPE;
    accessing a second aggregation device maintenance status indicator that corresponds to the second aggregation device; and
    based on the second aggregation device maintenance status indicator indicating that the second aggregation device is in a maintenance mode, inhibiting sending, by the policy controller, a request to implement the second differentiated feature on the second aggregation device.

8. The method of claim 1 further comprising:
    prior to sending the request to implement the first differentiated feature on the first aggregation device, accessing information that identifies a total quantity of differentiated features implemented on the first aggregation device;
    determining that the total quantity of differentiated features implemented on the first aggregation device is below a threshold value; and
    in response to determining that the total quantity of differentiated features implemented on the first aggregation device is below the threshold value, sending the request to implement the first differentiated feature on the first aggregation device.

9. The method of claim 1 further comprising:
    storing, in a data store, gate information that identifies the first differentiated feature and the first aggregation device.

10. The method of claim 1 further comprising:
    requesting, by the computing system from the first aggregation device, a list of all differentiated features implemented on the first aggregation device;
    accessing a data store that comprises a plurality of differentiated feature entries, each differentiated feature entry representing a differentiated feature believed to be implemented on the first aggregation device;
    determining that the list of all differentiated features does not match the plurality of differentiated feature entries; and
    performing an action.

11. The method of claim 10 wherein determining that the list of all differentiated features does not match the plurality of differentiated feature entries comprises determining that a differentiated feature entry identifies a differentiated feature not identified in the list of all differentiated features, and wherein performing the action comprises one of sending, to the first aggregation driver process, a request to implement the differentiated feature not identified in the list of all differentiated features on the first aggregation device, deleting, from the data store, the differentiated feature entry, and sending an alert that indicates the data store contains the differentiated feature entry that identifies a differentiated feature that is not implemented on the first aggregation device.

12. The method of claim 10 wherein determining that the list of all differentiated features does not match the plurality of differentiated feature entries comprises:
  determining that a differentiated feature identified in the list of all differentiated features corresponds to a differentiated feature entry; and
  determining that the differentiated feature contains a parameter that differs from a parameter in the differentiated feature entry; and
  wherein performing the action comprises one of sending, to the first aggregation driver process, a request to modify the differentiated feature to match the parameter in the differentiated feature entry, modifying the parameter in the differentiated feature entry to match the parameter in the differentiated feature identified in the list of all differentiated features, and sending an alert that indicates the differentiated feature contains the parameter that differs from the parameter in the differentiated feature entry.

13. The method of claim 10, further comprising:
  prior to requesting, by the computing system from the first aggregation device, the list of all differentiated features implemented on the first aggregation device, determining that the computing system has not previously requested the list of all differentiated features for at least a predetermined period of time.

14. A computing system, comprising:
  one or more computing devices operable to:
    determine that a first customer premises equipment (CPE) that provides external network access to a first local area network and that is communicatively coupled to a first aggregation device is to be dynamically provisioned with a first differentiated feature that is different from default features identified in a first boot configuration from which the first CPE obtains features during a boot phase of the first CPE;
    identify a first aggregation driver process of a plurality of aggregation driver processes that corresponds to the first aggregation device of a plurality of aggregation devices; and
    send, to the first aggregation driver process, a request to implement the first differentiated feature on the first aggregation device.

15. The computing system of claim 14, wherein to identify the first aggregation driver process that corresponds to the first aggregation device, the one or more computing devices are further operable to:
  access a data store that identifies the plurality of aggregation devices including the first aggregation device and that identifies, for each aggregation device that has a corresponding aggregation driver process, the corresponding aggregation driver process;
  access an entry in the data store that identifies the first aggregation device;
  determine, based on the entry, that there is no corresponding aggregation driver process for the first aggregation device;
  cause an initiation of the first aggregation driver process; and
  modify the entry to identify the first aggregation driver process.

16. The computing system of claim 15, wherein the one or more computing devices are further operable to:
  access information that identifies the first aggregation device as being a first aggregation device type of a plurality of different aggregation device types; and
  wherein to cause the initiation of the first aggregation driver process, the one or more computing devices are further operable to cause initiation of the first aggregation driver process from an executable that corresponds to the first aggregation device type.

17. The computing system of claim 14, wherein the one or more computing devices are further operable to:
  request, from the first aggregation device, a list of all differentiated features implemented on the first aggregation device;
  access a data store that comprises a plurality of differentiated feature entries, each differentiated feature entry representing a differentiated feature believed to be implemented on the first aggregation device;
  determine that the list of all differentiated features does not match the plurality of differentiated feature entries; and
  perform an action.

18. A non-transitory computer-readable storage medium that includes executable instructions to cause one or more processor devices to:
  determine that a first customer premises equipment (CPE) that provides external network access to a first local area network and that is communicatively coupled to a first aggregation device is to be dynamically provisioned with a first differentiated feature that is different from default features identified in a first boot configuration from which the first CPE obtains features during a boot phase of the first CPE;
  identify a first aggregation driver process of a plurality of aggregation driver processes that corresponds to the first aggregation device of a plurality of aggregation devices; and
  send, to the first aggregation driver process, a request to implement the first differentiated feature on the first aggregation device.

19. The non-transitory computer-readable storage medium of claim 18 wherein to identify the first aggregation driver process that corresponds to the first aggregation device, the instructions further cause the one or more processor devices to:
  access a data store that identifies the plurality of aggregation devices including the first aggregation device and that identifies, for each aggregation device that has a corresponding aggregation driver process, the corresponding aggregation driver process;
  access an entry in the data store that identifies the first aggregation device;
  determine, based on the entry, that there is no corresponding aggregation driver process for the first aggregation device;
  cause an initiation of the first aggregation driver process; and
  modify the entry to identify the first aggregation driver process.

20. The non-transitory computer-readable storage medium of claim 19, wherein the instructions further cause the one or more processor devices to:

access information that identifies the first aggregation device as being a first aggregation device type of a plurality of different aggregation device types; and wherein to cause the initiation of the first aggregation driver process, the instructions further cause the one or more processor devices to cause initiation of the first aggregation driver process from an executable that corresponds to the first aggregation device type.

\* \* \* \* \*